US006248839B1

(12) United States Patent
Esselborn et al.

(10) Patent No.: US 6,248,839 B1
(45) Date of Patent: Jun. 19, 2001

(54) MERCAPTO-CONTAINING BLOCK COPOLYMERS HAVING POLYMETHACRYLIC ACID AND POLYALKYLENE OXIDE REPEATING GROUPS

(75) Inventors: Eberhard Esselborn, Essen; Jürgen Fock, Dusseldorf; Arno Knebelkamp, Essen, all of (DE)

(73) Assignee: Th. Goldschmidt AG, Essen (DE)

( * ) Notice: Subject to any disclaimer, the term of this patent is extended or adjusted under 35 U.S.C. 154(b) by 0 days.

(21) Appl. No.: 09/018,144

(22) Filed: Feb. 3, 1998

(30) Foreign Application Priority Data

Feb. 13, 1997 (DE) .............................. 197 05 470

(51) Int. Cl.⁷ ................................... C08F 20/06
(52) U.S. Cl. ..................... 525/329.7; 525/330.1; 525/329.8; 525/330.3; 525/330.4; 560/129; 560/145; 560/152; 560/179; 560/189; 526/209; 526/211; 526/214; 526/224; 562/109; 562/110
(58) Field of Search ............... 525/329.7, 330.1, 525/329.8, 330.3, 330.4; 560/129, 145, 152, 179, 189; 562/109, 110

(56) References Cited

U.S. PATENT DOCUMENTS 5,294,728 * 3/1994 Emmons .............................. 526/214

OTHER PUBLICATIONS

Toshimitsu Suzuki, et al., "Syntheses of ABA Triblock Copolymers Initiated with Polymeric Metalloester", Macromolecules 15, 223–227 (1982).

Jinshan Wang, et al., Synthesis of AB (BA), ABA and BAB Block Copolymers of tert–Butyl Methacrylate (A) and Ethylene Oxide (B); J. Polym. Sci. A 30, 2251–2261 (1992).

Hardy Reuter, et al., "The Anionic Block Copolymerization of Ethylene Oxide with Tert–Butyl Methacrylate Diblock and Multiblock Copolymers", Eur. Polym. J. 27, 673–680 (1991).

* cited by examiner

Primary Examiner—Donald R. Wilson
Assistant Examiner—Ling-Siu Choi
(74) Attorney, Agent, or Firm—Scully, Scott, Murphy & Presser

(57) ABSTRACT

The invention relates to polymethacrylate acid-polyalkylene oxide block copolymers, to a process for their preparation and to their use as dispersants or suspension stabilizers for pigments and fillers, e.g. for metal oxides in ceramic materials, for pigments in inks used in ink jet printing and for fillers in thermoplastic and thermoset polymers.

2 Claims, No Drawings

MERCAPTO-CONTAINING BLOCK COPOLYMERS HAVING POLYMETHACRYLIC ACID AND POLYALKYLENE OXIDE REPEATING GROUPS

FIELD OF THE INVENTION

The invention relates to polymethacrylic acid-polyalkylene oxide block copolymers (hereinafter: polymethacrylic acid-b-polyalkylene oxide copolymers) of the AB and ABA types and their alkali metal or ammonium salts, where A is a polymethacrylic acid block and B is a polyalkylene oxide block.

The invention also relates to poly-t-butyl methacrylate-b-polyalkylene oxide copolymers as novel intermediates for preparing the polymers of the invention.

The invention further relates to a process for preparing such block copolymers and to their use. The products can be used, for example, as emulsifiers and as dispersants for dispersing inorganic materials in aqueous media.

BACKGROUND OF THE INVENTION

Polymethacrylic acid-b-polyalkylene oxide copolymers are known. However, their preparation presents considerable problems. From the prior art, which is not very comprehensive, mention may be made of: J. Polym. Sci. Part A 30, 2251–2261, 1992, describes AB (BA), ABA and BAB block copolymers based on polyethylene oxide and polymethacrylic acid. These products are prepared via a precursor route by first preparing a poly-t-butyl methacrylate-b-polyethylene oxide copolymer or a polyethylene oxide-b-poly-t-butyl methacrylate copolymer by sequential, anionic polymerization of t-butyl methacrylate and ethylene oxide or, conversely, ethylene oxide and t-butyl methacrylate, then subjecting this copolymer to an acid-catalyzed elimination of isobutene from the poly-t-butyl methacrylate segment to give the desired polyethylene oxide-b-polymethacrylic acid copolymers. However, this procedure can hardly be carried out in industry since ionic polymerization requires very pure, water-free solvents (in particular tetrahydrofuran) and reactants. In addition, the reaction has to be carried out at low temperatures of about −78° C. Moreover, the use of specific alkali metal initiators (potassium naphthalide or diphenylmethylpotassium) is necessary.

Similarly, in Eur. Polym. J. 27, 673–680, 1991, Ulbricht et al. describe the preparation of poly-t-butyl methacrylate-b-polyethylene oxide or polyethylene oxide-b-poly-t-butyl methacrylate diblock copolymers by means of anionic polymerization. The authors refer to secondary reactions: inter alia, the use of cumylpotassium as initiator for the polymerization of t-butyl methacrylate at a reaction temperature of 25° C. leads to a series of undesired secondary reactions, recognizable by a broadening of the molecular weight distribution and nonquantitative monomer conversions.

In Macromolecules 15, 223–227, 1982, the synthesis of poly-t-butyl methacrylate-b-polyethylene oxide-b-poly-t-butyl methacrylate copolymers (ABA type) is reported. As initiators, use is made of lithiated diesters of polyethylene oxide. This process too requires extremely high purity of the reagents used and relatively low polymerization temperatures (from −25 to 0° C.). The products obtained have a very broad molecular weight distribution which in this case too points to the occurrence of undesired secondary reactions.

The present invention addresses the industrial problem of preparing block copolymers whose segments are formed from alkylene oxides and methacrylic acid or its salts. The desired block copolymers should be obtainable in a very simple manner, free of secondary reactions and in high yield in order to make industrial manufacture of these compounds possible.

BRIEF SUMMARY OF THE INVENTION

It has now surprisingly been found that the desired block copolymers can be prepared in a simple manner by first reacting a poly-t-butyl methacrylate segment having a terminal ester or carboxyl group, which is obtained by free-radical polymerization of t-butyl methacrylate in the presence of ester- or carboxyl-functional mercaptans of the $R(H)$—$OC(0)$—$(CH_2)_p$—$SH$ type, with a monohydroxy- or dihydroxy-functional functional polyalkylene oxide segment of the general structure $R_1$—$(OC_nH_{2n})_o$—$OH$ or $H$—$(OC_nH_{2n})_o$—$OH$ in the necessary stoichiometric ratios in the presence of an esterification or transesterification catalyst and immediately afterwards converting the resulting poly-t-butyl methacrylate-b-polyalkylene oxide copolymer into the corresponding polymethacrylic acid-b-polyalkylene oxide copolymer by elimination of isobutene while retaining the linking ester group.

The invention accordingly provides, firstly, AB and ABA block copolymers of the formulae I or II

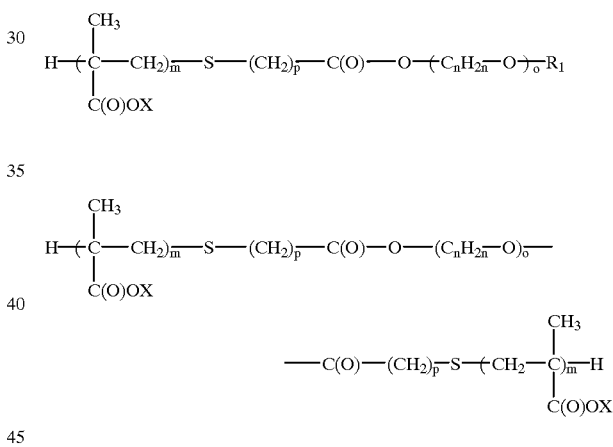

where
the radical $R_1$ is an alkyl, alkylaryl, alkenyl or sulfopropyl radical, preferably containing up to 18 carbon atoms,
m has a mean numerical value of $\geq 3$,
p is a number from 1 to 6,
n is a number from 2 to 18,
o is a number $\geq 1$ and
X is a cation.

DETAILED DESCRIPTION OF THE INVENTION $R_1$ is usually derived from an alcohol $R_1OH$ which functions as initiator alcohol for the polymerization of the oxyalkylene. Examples of radicals $R_1$ are the methyl, butyl, stearyl, allyl, hexenyl, nonylphenyl or oleyl radical. Preferred radicals $R_1$ are methyl and butyl radicals.

If n=2, the polyether radical contains only oxyethylene units. If the value of n is >2, the polyether radical comprises oxyethylene units and a proportion of oxyalkylene units having from 3 to 18 carbon atoms. Here, n can be a fraction from 2 to 18. Preferably, the oxyalkylene block comprises oxyethylene units, but if desired, either or both of oxypropylene and oxybutylene units are also permitted to be present in addition to the oxyethylene units. Oxyalkylene units having from 4 to 18 carbon atoms are preferred when it is desired that the product have oleophilic properties.

X is a cation. X is preferably a hydrogen atom, an alkali metal atom or an ammonium group which is unsubstituted or alkyl-substituted. Examples of such substituted ammonium groups are $NH(CH_3)_3$, $NH(C_2H_5)_3$, and $NH(CH_2—C_6H_5)(CH_3)_2$. Furthermore, it is possible to select the cations known from the prior art for polymethacrylic acid polymers (e.g. those obtained upon neutralization with tetrabutylammonium hydroxide or triethanolamine).

The indices m and o can be identical (if m and o$\geq$3) or different and usually have a mean numerical value of $\geq$3. Particular preference is given to numerical values of from 4 to 30 for m and from 20 to 100 for o.

Examples of block copolymers according to the invention are:

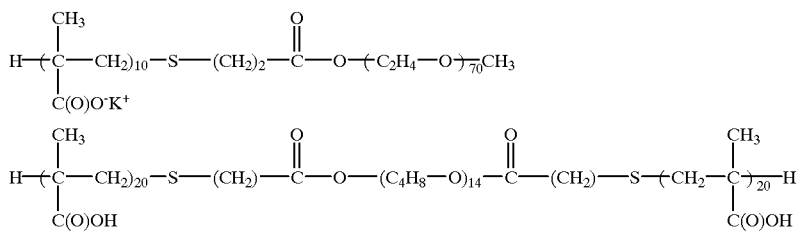

The invention further provides the t-butyl esters of the polyalkylene oxide-b-polymethacrylic acid copolymers formed as intermediates, which correspond to the formulae Formula III

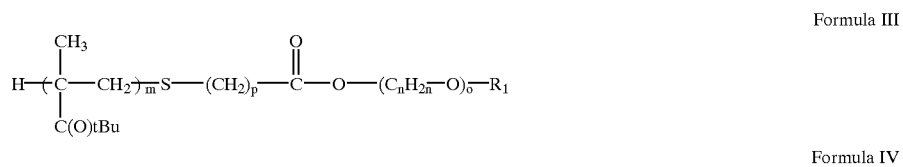

Formula IV

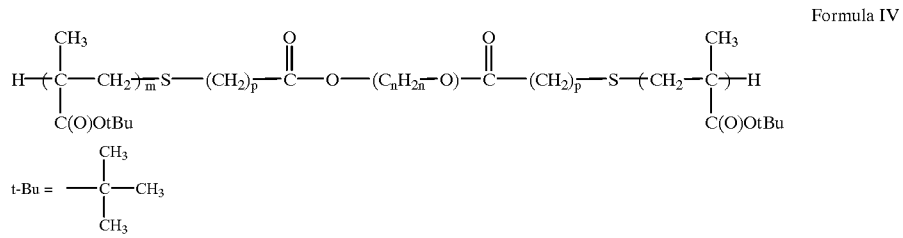

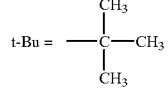

Here, the radicals and indices are as defined above. These intermediates are causal for the structure and properties of the end products. If desired, independent use may be made of them, for example for modifying surface properties of plastic moldings so as to increase the surface polarity.

Examples of these intermediates are:

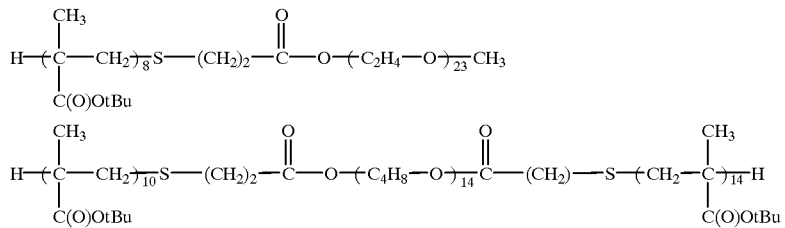

The Invention further provides a process for preparing the block copolymers of the invention. This process comprises a) transesterifying polymers of the formula

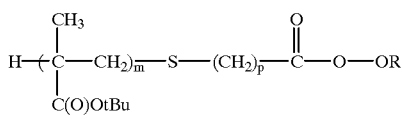

where the indices m and p are as defined above and the radical R is derived from a chain regulator known per se of the type $ROC(O)$—$(CH_2)_p$—$SH$, where R is a hydrogen atom or an alkyl radical having from 1 to 12 carbon atoms, with polymers of the formula

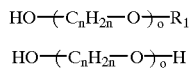

in a molar ratio of from 1.1:1.0 to 1.0:1.1 (for the preparation of AB block copolymers) or from 1.1:0.5 to 1.0:0.55 (for the preparation of ABA block copolymers) with the addition of catalysts known per se, if desired in the presence of an inert solvent, and b) converting the resulting polymers of the formulae III and IV into the desired block copolymers of the formulae I and II by elimination of isobutene at temperatures above 60° C. in the presence of acid as catalyst and, if desired, a solvent or at above as without catalyst and c) if desired, converting the product into the alkali metal or ammonium salt in a manner known per se.

Process step a) thus comprises a selective transesterification or esterification of a poly-t-butyl methacrylate which has been prepared by freeradical polymerization using an ester- or carboxyl-functional alkyl mercaptan as initiator, with a monohydroxy- or dihydroxy-functional polyalkaline oxide segment. These hydroxyl groups react selectively with the terminal ester group which has been introduced into the poly-t-butyl methacrylate segment by the regulator. The bridging segment

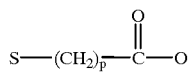

is therefore characteristic of the block copolymers of the invention. The transesterification is preferably carried out using a neutral transesterification catalyst know per se. Examples of such catalysts are alkyl titanates such as i-propyl titanate, n-butyl titanate or i-butyl titanate, also stannates such as dialkyltin acetate halide or dialkyltin esters, in particular dibutyltin dilaurate. For the esterification, preference is given to using tin(II) oxalate or known alkaline esterification catalysts such as potassium hydroxide.

In the second process step b), the desired block copolymer is obtained by elimination of isobutylene b1) at temperatures above 60° C. in the presence of acid as catalyst, in particular p-toluenesulfonic acid monohydrate, and, if desired, in the presence of a solvent such as dioxane or solvent mixtures such as toluene/dioxane, or b2) at temperatures above 160° C. without catalyst.

The resulting block copolymer may then be converted into the required alkali metal or ammonium salt.

It is particularly surprising that, under the reaction conditions selected, selective linking of the two polymer segments (process step a)) occurs without noticeable secondary reactions taking place at the t-butyl ester groups and also, in process b), the elimination of isobutene occurs with high selectivity, i.e. without cleavage of the ester linkage formed in process step a).

The acid-catalyzed elimination of isobutene particularly preferably takes place at temperatures of from 80 to 100° C. in the presence of a catalyst. Thermal elimination at higher temperatures results in the formation of anhydride structures which can be converted back into the free acid in a known manner.

The invention further provides for the use of the products as emulsifiers, in particular as dispersants and emulsifiers in aqueous media.

Preferred application areas for the polymers of the invention are their use as dispersants or suspension stabilizers for pigments and fillers, e.g. for metal oxides in ceramic materials, for pigments in inks used in ink jet printing and for fillers in thermoplastic and thermoset polymers.

The process of the invention and the properties of the block polymers of the invention are illustrated in the following examples.

EXAMPLE 1A

Preparation of a poly-t-butyl methacrylates by free-radical polymerization in the presence of methyl mercaptoacetate as chain-transfer agent.

A solution of 1.47 g of azobisisobutyronitrile and 106.1 g of methyl 3-mercaptoacetate in 150 g of xylene and 1137 g of t-butyl methacrylate (tMBA) were introduced over a period of 4 hours into a reactor charged with 150 g of xylene; the initially charged solvent was at a temperature of about 120° C. and was under a nitrogen atmosphere. After the reaction was complete, about 400 ppm of hydroquinone monomethyl ether were added and the solution was cooled to about 40° C., then the solvent and remaining monomer were distilled off at 110° C./1 torr, leaving a colorless, viscous liquid.

Analysis by gel permeation chromatography gave a number average molecular weight $M_n$ (GPC) of 1350 and a weight average molecular weight $M_w$ (GPC) of 2170 for the resulting polymer. The polydispersity (PD=$M_w$/Mn) is thus 1.61. Comparison of the molecular weight determined by vapor pressure osmometry ($M_n$/osmometry) gave an ester functionality of 1.04. The residual monomer content was <0.1%.

EXAMPLES 2A and 4A

Preparation of poly-t-butyl methacrylates of various molecular weights by free-radical polymerization in the presence of methyl mercaptocarboxylates.

The procedure of Example 1A was repeated, except that the molar ratios of t-butyl methacrylate to the corresponding chain regulator were changed as indicated in Table 1.

TABLE 1

| Example No. | Molar ratio of tMBA/ regulator | $M_n$/ NMR | $M_n$/ osmometry | $M_n$/GPC (PMMA standard) | Polydispersity PD = $M_w$/$M_n$ |
| --- | --- | --- | --- | --- | --- |
| 1A | 8/1 | 1150 | 1200 | 1350 | 1.61 |
| 2A | 4/1 | 630 | 650 | 680 | 1.52 |
| 3A | 20/1 | 2700 | 2850 | 2950 | 1.84 |
| 4A[1] | 8/1 | 1200 | 1250 | 1300 | 1.71 |

[1]Regulator: Methyl 3-mercaptopropionate

EXAMPLE 1B

Preparation of an α-methyl-ω-hydroxypolyethylene oxide 64 g (2 mol) of methanol and 23 g (0.33 mol) of potassium methoxide were placed in a reactor. After carefully flushing with pure nitrogen, the mixture was heated to 110° C. and 2360 g (about 54 mol) of ethylene oxide was added at such a rate that the internal temperature did not exceed 120° C. and the pressure did not exceed 6 bar. After all the ethylene oxide has been introduced, the temperature was held at 115° C. until the pressure measured by means of a pressure gauge was constant, indicating the end of the reaction. Finally, the unreacted monomers were removed under reduced pressure at from 80 to 90° C.

The product obtained was neutralized by means of phosphoric acid, the water was removed by distillation and the potassium phosphate formed was removed by filtration with a filter aid. The molecular weight derived from the determination of the hydroxyl number ($M_n$/OH number) at an assumed functionality of 1 was 1015.

Table 2 shows a selection of further monofunctional (Examples 1B to 3B) or difunctional polyethers (Examples 4B and 5B) which were used for the synthesis of the block copolymers according to the invention (Examples 1C to 6C or 1D to 6D). The products in Examples 4B and 5B are commercially obtainable products.

TABLE 2

| Polyether from Example | % of ethylene oxide | % of propylene oxide | $M_n$ (OH number) |
|---|---|---|---|
| 1B | 100 | — | 1015 |
| 2B | 100 | — | 2890 |
| 3B | 85 | 15 | 2945 |
| 4B[1] | 100 | — | 1050 |
| 5B[2] | — | — | 1030 |

[1]Polyethylene glycol
[2]Polyoxytetramethylene ether glycol (PolyTHF 1000/BASF)

EXAMPLE 1C

Preparation of a poly-t-butyl methacrylate-b-polyethylene oxide (AB) copolymer 600 g (about 0.5 mol) of the poly-t-butyl methacrylate described in Example 1A and 510 g (about 0.5 mol) of the monohydroxy-functional polyethylene oxide (see Example 1B), dissolved in about 250 ml of toluene, were heated under pure nitrogen to about 100° C. and the solvent was subsequently distilled off with simultaneous removal of any water present. 3.4 g (0.3% by weight) of isopropyl titanate was then added at a temperature of 115° C. and the pressure was set to about 2 torr immediately afterwards. The methanol liberated in the reaction, together with other volatile constituents (toluene, isopropanol), were continuously removed and condensed. After about 4 hours, the reaction was complete and the residual OH number of the reaction mixture was 2.3, corresponding to a conversion of about 91%. Analysis of the distillate (0.48 mol) by gas chromatography indicated a conversion of 96%.

Analysis by gel permeation chromatography gave a number average molecular weight ($M_n$/GPC) of 2850; the polydispersity (PD=$M_w/M_n$) was 1.26. Determination of the molecular weight by vapor pressure osmometry gave a value of 2170.

EXAMPLE 2C

Preparation of a poly-t-butyl methacrylate-b-polyethylene oxide-b-poly-t-butyl methacrylate (ABA) copolymer in the presence of an inert solvent 600 g (about 0.5 mol) of the poly-t-butyl methacrylates described in Example 1A and 260 g (about 0.25 mol) of the dihydroxy-functional polyethylene oxide (see Example 4B), dissolved in about 500 ml of toluene, were heated to about 110° C. under pure nitrogen in a reactor fitted with a superposed fractionating column and a small part of the solvent was first distilled off under atmospheric pressure until it could be seen that no more traces of water were present. 2.6 g (0.3% by weight) of isopropyl titanate were then added at a temperature of 115° C. The methanol liberated in the reaction was separated from the toluene by fractionation. After a reaction time of about 4 to 5 hours, the temperature at the top was 110° C.; the reaction was then complete. The residual OH number of the reaction mixture was about 1 under these conditions. Analysis of the distillate (0.48 mol) by gas chromatography gave a conversion of 98%.

Analysis by gel permeation chromography gave a number average molecular weight ($M_n$/GPC) of 4300; the polydispersity (PD=$M_w/M_n$) was 1.44.

EXAMPLES 3C to 6C

Preparation of poly-t-butyl methacrylate-b-polyethylene oxide (AB or ABA) copolymers The basic procedure of Examples 1C and 2C was repeated, except that, as indicated in Table 3, poly-t-butyl methacrylates of various molecular weights were reacted with various polyalkylene oxide homopolymers and copolymers.

TABLE 3

| Example | PtBMA from Example No. | Polyalkylene oxide from Example No. | conversion /OH number | Conversion /GC (methanol) | $M_n$/ GPC | PD = $M_w/M_n$ |
|---|---|---|---|---|---|---|
| 1C | 1A | 1B | 91 | 96 | 2850 | 1.26 |
| 2C | 1A | 4B | 95 | 98 | 4300 | 1.44 |
| 3C | 1A | 3B | 95 | 97 | 5400 | 1.22 |
| 4C | 4A | 2B | 92 | 95 | 5250 | 1.29 |
| 5C | 2A | 5B | 96 | 101 | 2600 | 1.59 |
| 6C | 3A | 1B | 90 | 95 | 4600 | 1.48 |

EXAMPLE 1D

Preparation of a Polymethacrylic acid-b-polyethylene oxide (AB or ABA) copolymer 250 g of the block copolymer obtained as described in Example 1C was mixed with about 6.3 g of p-toluenesulfonic acid monohydrate and heated to a temperature of from 95 to 100° C. The commencement of the elimination of isobutene could be recognized by distinct gas evolution. This was complete after a reaction time of 4 hours; the acid number of the product obtained was 230, which corresponds to a conversion of 96%. NMR spectroscopy (comparison of the signal intensities of the characteristic t-butyl group) indicated a conversion of about 95%.

EXAMPLES 2D to 6D

Preparation of various polymethacrylic acid-b-polyethylene oxide (AB or ABA) copolymers The procedure of Example 1D was repeated, except that the elimination of isobutene in Example 6D was carried out in the presence of dioxane as solvent. A 50% by weight solution of the block copolymer in dioxane was used for this purpose.

The corresponding examples are shown in Table 4; the conversions determined from the acid number and by NMR spectroscopy are likewise indicated.

TABLE 4

| Example No. | Block polymer from Tab. 3 Example No. | Acid number/ mg KOH/g | Conversion in %/acid number[1] | Conversion in %/MNR |
|---|---|---|---|---|
| 1D | 1C | 230 | 96 | 95 |
| 2D | 2C | 320 | 96 | 100 |
| 3D | 3C | 110 | 95 | 95 |
| 4D | 4C | 112 | 96 | 98 |
| 5D | 5C | 225 | 97 | 96 |
| 6D | 6C | 380 | 98 | 97 |

[1]taking into account the amount of p-toluene-sulfonic acid monohydrate weighed in

EXAMPLE E

Preparation of a poly(sodium methacrylate)-b-polyethylene oxide (AB) copolymer 2.0 g of the polymethacylic acid-b-polyethylene oxide prepared in Example 1D was suspended in 31 ml of water, treated with a few drops of phenolphthalein solution and admixed with a total of 7.3 ml of 1N NaOH until the color changed. As the pH increased, the solubility of the block copolymer in the aqueous phase rose; a clear colorless solution was obtained at the neutral point.

USE EXAMPLE

In the application test, the action of the block copolymers of the invention as dispersants for dipsersing aluminum oxide in water was examined.

For this purpose, 20 g of aluminum oxide powder (Aldrich, particle size <10 μm) was first suspended in 50 g of water (blank) and in 50 g of a 0.1 or 0.5% by weight aqueous solution of the block copolymers while stirring vigorously in a glass vessel for a period of 24 hours at room temperature; in a calibrated vessel, the time to the first occurrence of a sediment boundary was subsequently measured. In the case of very good dispersants, the time of this settling process is up to a few weeks, while poor dispersants lead to complete sedimentation within a few hours.

Table 5 shows typical sedimentation times and also figures for the sediment density, here reported as the ratio of measured sediment density to the known density of aluminum oxide. The sediment density too is a measure of the effectiveness of the dispersant: the higher the percentage value, the more effective are the stabilizing properties of the corresponding dispersant.

TABLE 5

| Block copolymer from Example | Concentration in mg of polymer/ml of water | Sedimentation time | Sediment density/% |
|---|---|---|---|
| None (blank) | — | 0.5 h | 22 |
| 1D | 1 | 35 h | 31 |
| 1D | 5 | 18 days | 49 |
| 4D | 1 | 28 h | 26 |
| 4D | 5 | 23 days | 51 |

It can be seen from the table that the block copolymers used according to the invention display the desired application properties.

It will be obvious to those skilled in the art that these examples represent only a selection of the possiblities which exist and are in no way to be regarded as a limitation.

What is claimed is:

1. A block copolymer having the formula

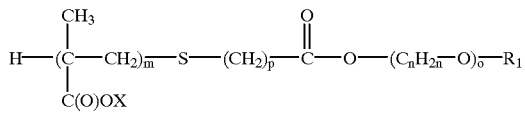

wherein $R_1$ is alkyl, alkylaryl, alkenyl, sulfopropyl, or

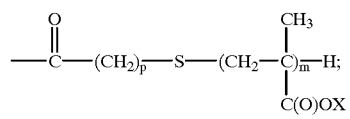

m has a mean numerical value of at least 3; p is a number of 1 to 6; n is a number of 2 to 18;

o is a number of at least 1; and X is a cation.

2. A block copolymer as claimed in claim 1, wherein the radicals and indices, either individually or in combination, have the following meanings:

$R_1$ is an alkyl or alkenyl radical having from 1 to 8 carbon atoms, m has a mean numerical value of from 4 to 20, p has a value of 2, n has a value of from 2 to 3, o has a mean numerical value of from 20 to 100 and X is a hydrogen atom, an alkali metal atom or an unsubstituted or alkyl-substituted ammonium group.

* * * * *